Oct. 19, 1926.
A. BOYAJIAN
1,603,833
ALTERNATING CURRENT POLYPHASE TRANSFORMER
Filed May 28, 1923
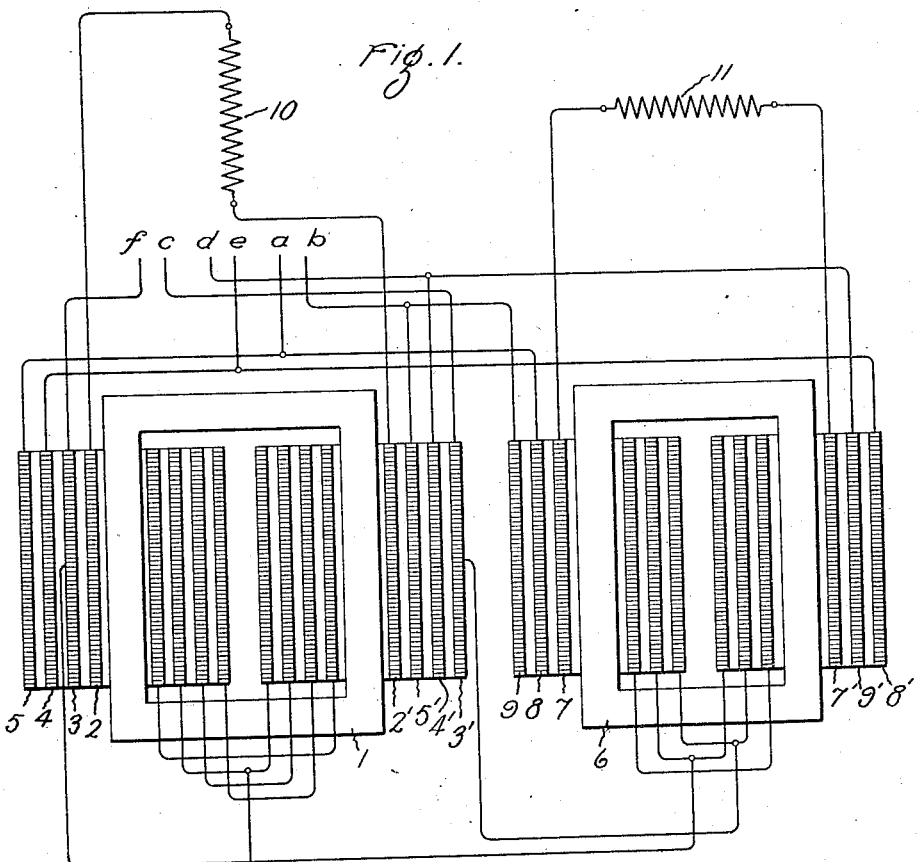
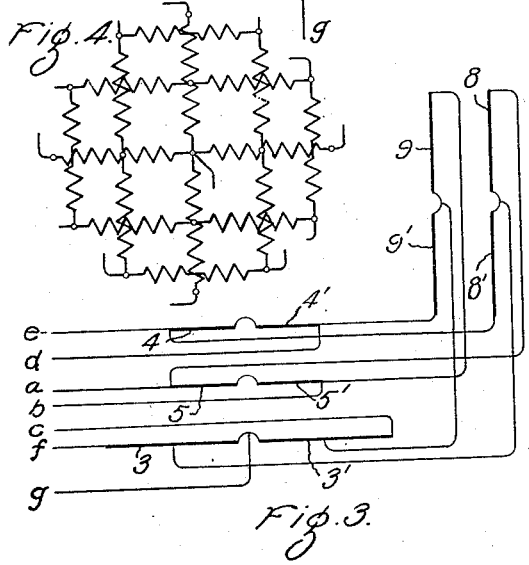
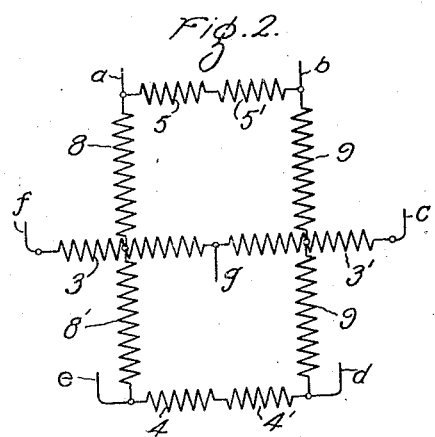
Inventor:
Aram Boyajian,
by *His Attorney.*

Patented Oct. 19, 1926.

1,603,833

UNITED STATES PATENT OFFICE.

ARAM BOYAJIAN, OF PITTSFIELD, MASSACHUSETTS, ASSIGNOR TO GENERAL ELECTRIC COMPANY, A CORPORATION OF NEW YORK.

ALTERNATING-CURRENT POLYPHASE TRANSFORMER.

Application filed May 28, 1923. Serial No. 641,867.

My invention relates to alternating current polyphase transformers. The general object of the invention is to provide a simple and efficient arrangement and interconnection of transformer windings for converting polyphase current from a two phase source into six phase current suitable for various purposes such as the operation of synchronous converters and alternating current rectifiers.

In most transformer systems which have heretofore been suggested for phase transformation, the internal power factor has been considerably less than unity so that it was necessary that the capacity of the transformer apparatus be greater than the maximum load which it was capable of supplying. The present invention provides a transformer system in which the internal power factor is unity. This means that the capacity of the transformer apparatus need be no greater than the load which it is to supply.

Most six phase transformer loads are low voltage synchronous converter loads and the invention permits all interconnection between the transformer windings to be on the six phase side where the problem of providing the necessary insulation is simplest. The two phase side of the system, which is usually the high voltage side, is entirely free of interconnection between windings.

The invention further provides a six phase source of current which may also supply three phase current of reduced voltage for any desired purpose such as for starting a six phase converter.

Other objects and advantages will appear from the following description taken in connection with the accompanying drawing in which Fig. 1 shows two single phase transformers with their windings interconnected to transform alternating current from two phase to six phase in accordance with the invention; Fig. 2 is a diagrammatic view of the six phase side of the system, the manner in which the windings are connected and their phase relations being indicated; Fig. 3 is another diagrammatic view indicating the phase relations of the six phase windings and their connections, and Fig. 4 is a diagrammatic view of a simple modification for transforming current from two phase to twelve phase.

Similar reference characters refer to like parts in the different figures of the drawing.

In the particular arrangement shown in Fig. 1, two single phase transformers are employed, each of these transformers being of the core type with two winding legs. One of the transformers includes a core 1, a primary exciting winding 2—2′ and three secondary windings 3—3′, 4—4′ and 5—5′, each winding being divided into two equal series connnected sections. The other transformer includes a core 6, a primary exciting winding 7—7′ and two secondary windings 8—8′ and 9—9′, each of these windings being also divided into two equal sections. Voltages having a relative phase displacement of ninety degrees are impressed respectively on the two primary windings 2—2′ and 7—7′ as by connecting these two windings to the two phases 10 and 11 respectively of any suitable source of two phase current. The voltage of a transformer secondary being parallel to that of its primary, it follows that the voltages of the secondaries of each transformer are in phase with each other but are displaced ninety degrees in phase from the secondaries of the other transformer. In order to equalize the reactance of the windings, the sections of the secondary windings on one leg of each transformer are arranged in reverse order from their core leg as compared with the corresponding sections on the other leg.

The interconnections of the windings and the arrangement of their terminals are shown in the various figures of the drawing, the phase relations of the secondary or six phase windings being indicated most clearly in Fig. 2. The voltage of each winding is divided equally between its two sections which are obviously in phase with each other. The interconnected secondary windings are provided with six terminals $a$, $b$, $c$, $d$, $e$ and $f$ adapted to deliver six phase current and with a neutral terminal $g$. The two six phase terminals $f$ and $c$ are connected respectively to the two outer terminals of the winding 3—3′ and the neutral terminal $g$ is connected to the central point of this winding, that is, to the connection between its two equal sections 3 and 3′. The outer terminals of the winding sections 5 and 8 are connected together and to the six phase terminal $a$ and similar connections are made respectively between the outer terminals of the winding sections 5' and 9 and the six phase terminal b, the outer terminals of the winding sections 4' and 9' and the six phase terminal d, and the outer terminals of the winding sections 4 and 8' and the six phase terminal e. The center of the winding section 3 is provided with a tap which is connected to the center of the winding 8—8', that is, to the connection between its two equal sections 8 and 8', and the center of the winding section 3' is similarly provided with a tap which is connected to the center of the winding 9—9', that is, to the connection between its two equal sections 9 and 9'.

The voltages of the two windings 5—5' and 4—4' are equal and in phase and may be assumed to have a value V. Then the voltage of the winding 3—3' is twice as great or 2V and these three voltages are in phase. The voltages of the windings 8—8' and 9—9' are equal and have a value $\sqrt{3}V$. These latter two voltages are in phase with each other but are displaced ninety degrees in phase from the voltages of the windings 3—3', 4—4' and 5—5'. From the geometry of these phase and voltage relations as indicated most clearly in Fig. 2, it is apparent that the six phase terminals, a, b, c, d, e and f are symmetrically disposed about the neutral point of the system to which the neutral terminal g is connected and that therefore these six phase terminals are adapted to deliver six phase current. Of course, absolute exactness in the ratios between the voltages of the various windings and in their phase relations is not essential and these may be varied somewhat without objectionably distorting the system.

In accordance with a simple modification of the invention, as indicated in Fig. 4, alternating current may be conveniently converted from two phase to twelve phase. In this arrangement, two six phase secondary winding systems such as has been described are employed, the neutral points of the two systems being connected together to form a common neutral for the twelve phase system and the two systems having a relative phase displacement of ninety degrees. This phase displacement of the two component six phase systems may obviously be attained by exciting each winding of one of the component six phase systems from a source of current which is displaced ninety degrees in phase from the source of current which excites the corresponding winding of the other component six phase system.

The invention provides a simple apparatus for converting alternating current from two phase to six phase or twelve phase and the apparatus has the advantage of high efficiency and econmy in operation, the internal or apparatus efficiency being unity. Insulation problems are also simple as all interconnection between windings having different phase relations are on the six phase side of the apparatus which is generally the low voltage side. Another advantage of the invention is that three phase current of reduced voltage may be obtained from the neutral connection of the six phase system and any two adjacent six phase terminals. This reduced voltage current may be conveniently used as starting current for a six phase converter which may be switched over to the six phase terminals after coming up to speed. It will be obvious that although the invention has been described as being applicable to a system for transforming from two to six or twelve phase it may be also applied in the transformation of current from twelve or six phase to two phase.

What I claim as new and desire to secure by Letters Patent of the United States, is:—

1. A polyphase transformer system comprising a group of three windings in phase with each other, and a group of two windings in phase with each other and displace ninety degrees in phase from said group of three windings, said two windings being connected between the terminals of two of said group of three windings and having their centers connected to intermediate points of the third of said group of three windings.

2. A polyphase transformer system comprising a group of three windings in phase with each other, a group of two windings in phase with each other and displaced ninety degrees in phase from said group of three windings, said two windings being connected between the terminals of two of said group of three windings and having their centers connected to intermediate points of the third of said group of three windings, and a neutral terminal connected to the center of said third winding of said group of three.

3. A polyphase transformer system comprising a group of three windings in phase with each other, the voltages of two of said windings being the same and equal to one half the voltage of the third winding; and a group of two windings in phase with each other and having equal voltages, the voltage of each of said latter windings being greater than the voltage of each of said equal voltage windings of said group of three in the ratio $\sqrt{3}:1$ the windings of said group of two being connected across the terminals of said equal voltage windings of said group of three and having their centers connected respectively to points midway between the center and the two terminals of the third winding of said group of three.

4. A twelve phase transformer system comprising two component six phase systems, each of said six phase systems including a group of three windings in phase with each other, and a group of two windings in phase with each other and displaced ninety degrees in phase from said group of three windings, said two windings being connected between the terminals of two of said group of three windings and having their centers connected to intermediate points of the third of said group of three windings, said two six phases systems having a relative angular phase displacement of ninety degrees, and the centers of the third windings of the two groups of three being connected together to form a common neutral for said twelve phase system.

In witness whereof, I have hereunto set my hand this 24th day of May, 1923.

ARAM BOYAJIAN.